United States Patent [19]

Malott

[11] 4,402,515
[45] Sep. 6, 1983

[54] LABYRINTH SEAL WITH CONTAMINATION TRAP

[75] Inventor: Richard C. Malott, Indianapolis, Ind.

[73] Assignee: General Motors Corp., Detroit, Mich.

[21] Appl. No.: 359,145

[22] Filed: Mar. 17, 1982

[51] Int. Cl.³ .............................................. F16J 15/44
[52] U.S. Cl. ...................................... 277/24; 277/25; 277/53; 277/67; 415/174
[58] Field of Search ....................... 277/24, 25, 53–57, 277/67–69, 237, DIG. 10; 415/174

[56] References Cited

U.S. PATENT DOCUMENTS

| 1,872,251 | 8/1932 | Cowin ................................ 277/57 X |
| 2,210,823 | 8/1940 | Victor et al. ........................... 277/25 |
| 2,998,991 | 9/1961 | Spencer ............................ 277/53 X |
| 3,159,969 | 12/1964 | Ernst et al. ..................... 277/57 UX |
| 3,602,559 | 8/1971 | Hirschler .......................... 277/57 X |
| 3,614,112 | 10/1971 | Herzog ............................. 277/67 X |
| 3,701,536 | 10/1972 | Matthews et al. .................... 277/56 |

FOREIGN PATENT DOCUMENTS

| 927842 | 5/1955 | Fed. Rep. of Germany ........ 277/53 |
| 734469 | 5/1980 | U.S.S.R. ............................... 277/53 |

Primary Examiner—Robert S. Ward, Jr.
Attorney, Agent, or Firm—Saul Schwartz

[57] ABSTRACT

A labyrinth seal of abradable design between a shaft and a partition separating regions of high and relatively lower gas pressure. The seal is located in close proximity to a gas permeable bearing also disposed between the shaft and the partition and located in the relatively lower pressure region. The seal permits limited leakage gas flow toward and through the bearing and pieces of seal material abraded during shaft rotation tend to entrain in the leakage gas flow. A baffle is disposed on the shaft between the seal and the bearing and defines a portion of a serpentine path for the leakage gas flow. A contamination trap containing a self-supporting adhesive material is formed on the baffle perpendicular to a portion of the serpentine path so that while the leakage gas turns 90° at the trap, the heavier particles of abraded material impact on and are captured by the adhesive material.

5 Claims, 1 Drawing Figure

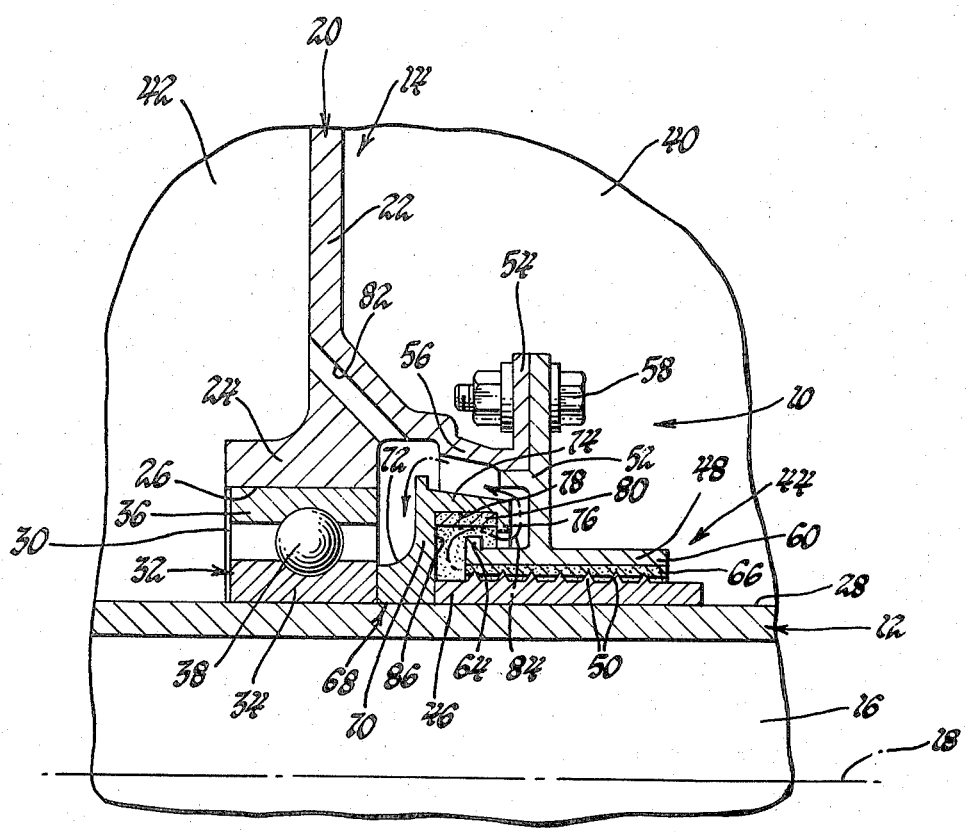

LABYRINTH SEAL WITH CONTAMINATION TRAP

BACKGROUND OF THE INVENTION

1. Field of the Invention

This invention relates generally to gas pressure seal arrangements and, more particularly, to an improvement in seal arrangements employing abradable, labyrinth type seals.

2. Description of the Prior Art

Labyrinth seal arrangements are used extensively in devices such as gas turbine engines to seal spaces between engine components having high relative rotational speeds. Such seal arrangements are typically disposed between rotating shafts or other rotor assemblies and fixed structures within the engines forming barriers between areas of different gas pressure although they may also be found between two components rotating relative to each other and to fixed references. In either case, the necessity of maintaining high engine efficiency by minimizing gas leakage has given rise to numerous labyrinth seal proposals including abradable seals wherein rings on one of the relatively moving components physically engage cylindrical surfaces on the other of the relatively moving components and abrade or rub away portions of the surfaces to provide rotating seals of essentially zero clearance. In addition, in some applications a bearing is disposed between the relatively moving components and in close proximity to the abradable labyrinth seal. In environments such as the latter or in labyrinth seal applications generally, a labyrinth seal arrangement according to this invention represents an improvement over other known labyrinth seal arrangements through its inclusion of means for collecting material abraded from the seal.

SUMMARY OF THE INVENTION

The primary feature, then, of this invention is that it provides a new and improved labyrinth seal arrangement between relatively rotating structural components wherein the seal is of abradable design. Another feature of this invention is that it provides a new and improved labyrinth seal arrangement including an abradable seal and particularly suited for applications wherein the seal is disposed in close proximity to a bearing between the relatively rotating components. Yet another feature of this invention resides in the provision in the new improved labyrinth seal arrangement of contamination trap means between the seal and the bearing for trapping and confining abraded seal material. Still another feature of this invention resides in the provision in the new and improved labyrinth seal arrangement of an abradable seal allowing controlled gas leakage flow toward the bearing and in the provision of contamination trap means in the leakage gas flow path which captures and confines abraded seal material entrained in the leakage gas. A still further feature of this invention resides in the provision in the new and improved labyrinth seal arrangement of contamination trap means including a baffle defining a serpentine flow path for leakage gas and in the provision of adhesive means on a wall of the baffle oriented perpendicular to the flow of leakage gas, the adhesive means being operative to trap relatively heavy particles of abraded seal material which impact thereon as the gas flow is redirected by the baffle wall having the adhesive means disposed thereon.

These and other features of this invention will be readily apparent from the following specification and from the single drawing FIGURE illustrating a representative improved labyrinth seal arrangement according to this invention.

Referring now to the single drawing FIGURE, a labyrinth type gas pressure seal arrangement according to this invention and designated generally 10 is shown disposed between a first member 12 rotatable relative to a second member 14. In the illustrated embodiment, the first member 12 is a cylindrical shaft 16 rotatable on an axis 18 and is representative of typical shafts or other rotating elements of gas turbine engines. The second member, 14 in the illustrated embodiment, is a stationary wall or web 20 representative of typical fixed, internal partitions in gas turbine engines. Of course, the web 20 may also be another element of the gas turbine engine rotating relative to shaft 16 and to a fixed casing or housing of the engine, not shown. Referring again, to the illustrated embodiment, the stationary web 20 includes a generally annular partition portion 22 disposed perpendicular to axis 18 and rigidly attached at its radially outermost extremity to a fixed structural member, not shown, as for example a casing or housing of a gas turbine engine. An annular flange 24 integral with the partition portion 22 defines an internal cylindrical surface 26 which surface cooperates with an outer cylindrical surface 28 of shaft 16 in defining an annular gap 30 between the shaft and the web. A roller bearing 32 is disposed in the gap 30 between the surface 28 of shaft 16 and surface 26 of flange 24 and includes an inner race 34 rotatable with the shaft 16, an outer race 36 rigidly attached to the web 20 and a plurality of spherical rolling elements 38 disposed in conventional manner between the inner and outer races. The bearing 32 supports the shaft 16 on the web 20 for rotation on the axis 18 which may, for example, be the longitudinal axis of a gas turbine engine. In addition, clearances between the inner and outer races 34 and 36 and between the rolling elements 38 render the bearing gas permeable so that gas flows across the bearing from a relatively high pressure region 40 to the right of web 20 to a relatively low pressure region 42 to the left of web 20.

With continued reference to the drawing FIGURE, the seal arrangement 10 includes a labyrinth seal 44 having a rotating portion 46 and a fixed portion 48. The rotation portion 46, a cylindrical sleeve fixed to and rotatable with shaft 16, has a plurality of axially spaced annular ridges 50 integral therewith. The fixed portion 48 of the seal includes a ring-like support 52 rigidly attached to a flange 54 integral with an axial extension 56 of the web 20 by a bolt 58 representative of a ring of such bolts. The ring-like support 52 rigidly mounts a cylinder 60 around the rotating portion 46. A small outwardly-turned flange 64 is formed on the cylinder 60 at the end thereof nearest bearing 32 and the innermost surface of the cylinder 60 facing rotating portion 46 carries a layer 66 of abradable seal material. In conventional fashion, the projections 50 on the rotating portion 46 contact and abrade corresponding sections of the abradable layer 66 to form the labyrinth seal which permits limited leakage flow from high pressure region 40, through bearing 32, to low pressure region 42.

The labyrinth seal arrangement 10 further includes an annular baffle 68 supported on the shaft 16 between the rotatable portion 46 of the seal and the inner race 34 of the bearing 32 for rotation as a unit with the shaft. The baffle has a radial wall 70 longitudinally spaced from the bearing 32 and from the flange 64 on the cylinder 60 and defines on the face thereof adjacent the bearing 32 an oil slinger 72. An axially extending wall 74 of the baffle integral with radial wall 70 is radially outwardly spaced from the fixed portion 46 of the seal and has an inwardly directed annular lip 76 at the end thereof. The radial wall 70, the axial wall 74, and the lip 76 cooperate in defining an annular trough 78 which opens radially inward and which contains a predetermined quantity of a self supporting paste-like adhesive material 80 which may, for example, be a quantity of thick lubricating grease. An oil exhaust passage 82 representative of an array of such passages, extends through the web 20 from a location generally radially outboard of the slinger 72 to a still further radially outward location on the opposite side of partition portion 22.

Describing now the operation of the labyrinth seal arrangement 10 according to this invention, under normal operating conditions the seal 44 permits a limited and controlled leakage gas flow from high pressure region 40 to low pressure region 42 and lubricant is directed at the bearing 32 from a location in low pressure region 42. Some of the lubricant makes its way across the bearing where it contacts the slinger 72. The slinger, rotating at high speed with shaft 16, directs the oil radially outwardly to the passages represented by passage 82 which convey the oil back to the low pressure region 42 to the left of the web. Little or no lubricant penetrates toward seal 44 beyond the slinger 72. The baffle 68, disposed between the bearing 32 and the seal 44, cooperates with the support 52 and the axial extension 56 of the web in defining a tortuous or serpentine flow path 84 for leakage gas from the left end of cylinder 60 to the bearing 32. The serpentine path 84 includes a plurality of 90° bends whereby the leakage gas is caused to make abrupt direction changes.

To effect the required seal between fixed and rotating portion 48 and 46, the projections 50 periodically contact the layer 66 and abrade or wear off pieces of the coating. These abraded pieces are relatively light and tend to entrain themselves in the leakage gas flow moving across the seal from the high pressure region 40 toward the low pressure region 42. Thus entrained, the particles of abraded seal material tend to follow the serpentine flow path defined by the baffle 68 and, in particular, are first directed radially outward by a surface 86 of wall 70 of the baffle in a direction perpendicular to the trough 78 fitted with adhesive material 80. When the leakage gas encounters the trough 78, it is redirected thereby back toward the support 52 and then back toward the bearing 32. The abraded particles, however, are heavier than the gas, and may even be accelerated by redirection to radial movement, so that the particles do not turn with the gas but, rather, impact on and are captured by the adhesive material in the trough 78. The abraded material remains captured in the adhesive material until a service overhaul during which the contaminated adhesive material is removed from the trough and replaced by uncontaminated adhesive. The adhesive material 80 in the trough 78 must be self supporting so that during periods when the engine is not operating the material will not flow under the influence of gravity to the lowest point in the trough.

The embodiments of the invention in which an exclusive property or privilege is claimed are defined as follows:

1. In a device having a region of high gas pressure, a region of relatively lower gas pressure, a first member defining a barrier between said high and said relatively lower gas pressure regions, a second member straddling said high and said relatively lower gas pressure regions and rotatable relative to said first member, and an abradable seal between said first and said second members permitting a controlled flow of leakage gas across said first member and producing particles of abraded material tending to entrain in said flow of leakage gas, the improvement comprising, contamination trap means operative to trap and retain abraded seal material impinging thereon, means defining a flow path for said flow of leakage gas, and means supporting said contmination trap means on one of said first and said second members with said contamination trap means generally perpendicular to a portion of said flow path so that abraded material entrained in said flow of leakage gas impinges on and is retained by said contamination trap means.

2. In a device having a region of high gas pressure, a region of relatively lower gas pressure, a first member defining a barrier between said high and said relatively lower gas pressure regions, a second member straddling said high and said relatively lower gas pressure regions and rotatable relative to said first member, a gas permeable bearing disposed between said first and said second members, and an abradable seal between said first and said second members permitting a controlled flow of leakage gas across said first member and producing particles of abraded material tending to entrain in said flow of leakage gas, said bearing being disposed in said relatively lower pressure region, the improvement comprising, contamination trap means operative to trap and retain abraded seal material impinging thereon, means defining a flow path between said seal and said bearing for said flow of leakage gas, and means supporting said contamination trap means on one of said first and said second members with said contamination trap means generally perpendicular to a portion of said flow path so that abraded material entrained in said flow of leakage gas impinges on and is retained by said contamination trap means.

3. In a device having a region of high gas pressure, a region of relatively lower gas pressure, a first member defining a barrier between said high and said relatively lower gas pressure regions, a second member straddling said high and said relatively lower gas pressure regions and rotatable relative to said first member, a gas permeable bearing disposed between said first and said second members, and an abradable seal between said first and said second members permitting a controlled flow of leakage gas across said first member and producing particles of abraded material tending to entrain in said flow of leakage gas, said bearing being disposed in said relatively lower pressure region, the improvement comprising, a baffle supported on said second member for rotation as a unit therewith between said bearing and said abradable seal and defining at least a portion of a serpentine path for said flow of said leakage gas between said abradable seal and said bearing, contamination trap means operative to trap and retain abraded seal material impinging thereon, and means mounting said contamination trap means on said baffle with at least a portion of said contamination trap means disposed perpendicular to a section of said serpentine path so that abraded material entrained in said flow of leakage gas impinges on and is retained by said contamination trap means.

4. In a device having a region of high gas pressure, a region of relatively lower gas pressure, a stationary web defining a barrier between said high and said relatively lower gas pressure regions, a shaft projecting through an aperture in said web and straddling said high and said relatively lower gas pressure regions, said shaft being rotatable relative to said web, a gas permeable bearing disposed between said shaft and said web, an abradable labyrinth type seal between said shaft and said web permitting a controlled flow of leakage gas across said web and producing particles of abraded material tending to entrain in said flow of leakage gas, said bearing being disposed in said relatively lower pressure region and generally in the path of said flow of leakage gas, and means directing a flow of liquid lubrication at said bearing from said relatively lower pressure region, the improvement comprising, a baffle rigidly attached to said shaft between said abradable seal and said bearing, means on said baffle adjacent said bearing defining a slinger to propel said liquid lubricant radially outward into a plurality of exhaust passages in said web, means on said baffle defining a wall projecting radially from said shaft and an integral cylindrical trough spaced radially outboard from and opening inward toward said shaft, said wall and cylindrical trough forming a portion of a serpentine path for said flow of leakage gas from said abradable seal toward said bearing, and contamination trap means in said trough operative to trap and retain abraded material entrained in said flow of leakage gas and impinging on said contamination trap means as said flow of leakage gas proceeds along said serpentine path toward said bearing.

5. The improvement recited in claim 3 wherein said contamination trap means is a self-supporting paste-like material filling said trough around the entire circumference of said shaft.

* * * * *